United States Patent
Koyama

(10) Patent No.: US 11,953,849 B2
(45) Date of Patent: Apr. 9, 2024

(54) IMAGE FORMING APPARATUS

(71) Applicant: BROTHER KOGYO KABUSHIKI KAISHA, Nagoya (JP)

(72) Inventor: Tatsuya Koyama, Toyoake (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/812,213

(22) Filed: Jul. 13, 2022

(65) Prior Publication Data

US 2023/0036856 A1 Feb. 2, 2023

(30) Foreign Application Priority Data

Jul. 30, 2021 (JP) ................... 2021-125942

(51) Int. Cl.
*G03G 15/20* (2006.01)
*G01K 3/00* (2006.01)

(52) U.S. Cl.
CPC ......... *G03G 15/2039* (2013.01); *G01K 3/005* (2013.01)

(58) Field of Classification Search
CPC ............ G03G 15/2039; G01K 3/005
See application file for complete search history.

(56) References Cited

U.S. PATENT DOCUMENTS

| | | | |
|---|---|---|---|
| 2012/0026689 A1* | 2/2012 | Ohno | F04D 25/166 361/695 |
| 2014/0169850 A1* | 6/2014 | Matsuo | G03G 15/2039 399/341 |
| 2021/0055678 A1* | 2/2021 | Nojima | G03G 15/20 |

FOREIGN PATENT DOCUMENTS

| | | |
|---|---|---|
| JP | 9-114288 A | 5/1997 |
| JP | 2005-43667 A | 2/2005 |
| JP | 2012-128330 A | 7/2012 |

* cited by examiner

*Primary Examiner* — Stephanie E Bloss
*Assistant Examiner* — Michael A Harrison
(74) *Attorney, Agent, or Firm* — Merchant & Gould P.C.

(57) ABSTRACT

An image forming apparatus comprises a main body casing; a fixing unit which fixes a developer to a sheet by means of heating and pressurization; a fan which is provided to discharge air inside the main body casing to outside of the main body casing; and a controller. The fixing unit includes a heating unit which heats the sheet; and a temperature sensor which detects a temperature of the heating unit. When the fixing unit is fixing the developer to the sheet, the controller is configured to: determine a heating unit temperature based on the temperature detected by the temperature sensor; stop the fan in a case of determining that the heating unit temperature is not less than a threshold value; and drive the fan in a case of determining that the heating unit temperature is less than the threshold value.

12 Claims, 12 Drawing Sheets

IMAGE FORMING APPARATUS

REFERENCE TO RELATED APPLICATIONS

This application claims priority from Japanese Patent Application No. 2021-125942 filed on Jul. 30, 2021. The entire content of the priority application is incorporated herein by reference.

BACKGROUND ART

Conventionally, an image forming apparatus is known, in which the driving of a fan is started if the temperature of a fixing unit exceeds a predetermined temperature, while the fan is stopped if the temperature of the fixing unit is not more than the predetermined temperature.

DESCRIPTION

In the meantime, for example, the toner and the parts made of resin generate minute particles in some cases on account of the high temperature of the fixing unit. For this reason, if the fan is driven when the temperature of the fixing unit exceeds the predetermined temperature as in the conventional technique, it is feared that the minute particles may be discharged to the outside of the main body casing.

In view of the above, an object of the present disclosure is to suppress the minute particles generated in the state of the high temperature of the fixing unit from being discharged to the outside of the main body casing.

According to an aspect of the present disclosure, there is provided an image forming apparatus including: a main body casing; a fixing unit configured to fix developer to a sheet by heating and pressurization; a fan configured to discharge air inside the main body casing to outside of the main body casing; and a controller. The fixing unit includes a heating unit configured to heat the sheet; and a temperature sensor configured to detect a temperature of the heating unit. When the fixing unit is fixing the developer to the sheet, the controller is configured to: determine a heating unit temperature based on the temperature detected by the temperature sensor; stop the fan in a case of determining that the heating unit temperature is not less than a threshold value; and drive the fan in a case of determining that the heating unit temperature is less than the threshold value.

According to this configuration, the fan is stopped if the heating unit temperature is not less than the threshold value during the fixing. Therefore, the minute particles, which are generated in a state in which the temperature of the fixing unit is high, can be suppressed from being discharged to the outside of the main body casing.

Further, the temperature sensor may be arranged at a position corresponding to a peak of a temperature distribution of the heating unit; and the controller may be configured to determine the temperature of the heating unit detected by the temperature sensor as the heating unit temperature.

According to this configuration, the driving of the fan is controlled based on the temperature at the position corresponding to the peak. Therefore, it is possible to appropriately determine whether or not the minute particles are generated, for example, as compared with a case in which the driving of the fan is controlled based on any temperature at any position different from the position corresponding to the peak. Further, it is unnecessary to correct the detected temperature, for example, as compared with a mode in which the detected temperature of the temperature sensor is corrected to a temperature at the position corresponding to the peak. Therefore, it is possible to reduce the load exerted on the controller.

Further, the temperature sensor may be arranged at a position different from a position corresponding to a peak of a temperature distribution of the heating unit; and the controller may be configured to: calculate a temperature which corresponds to a temperature at the position corresponding to the peak, based on the detected temperature; and determine the calculated temperature as the heating unit temperature.

According to this configuration, the driving of the fan is controlled based on the temperature at the position corresponding to the peak. Therefore, it is possible to appropriately determine whether or not the minute particles are generated, for example, as compared with a case in which the driving of the fan is controlled based on any temperature at any position different from the position corresponding to the peak. Further, the temperature at the position corresponding to the peak is calculated based on the detected temperature of the temperature sensor arranged at the position different from the position corresponding to the peak. Therefore, it is possible to appropriately control the driving of the fan even when the temperature sensor is arranged at any position which does not correspond to the peak.

Further, the heating unit may be long in a longitudinal direction, and the temperature sensor may be arranged at an end portion of the heating unit in the longitudinal direction.

According to this configuration, the temperature at the end portion of the heating unit can be detected by the temperature sensor. Therefore, for example, it is possible to suppress any excessive increase in the temperature of the end portion of the heating unit based on the detection result of the temperature sensor.

Further, the heating unit may be long in a longitudinal direction, and the temperature sensor may be arranged at a central portion of the heating unit in the longitudinal direction.

According to this configuration, it is possible to estimate the temperature at the position corresponding to the peak based on the temperature at the central portion of the heating unit.

Further, the temperature sensor may be arranged at a position at which a minimum width sheet does not pass. The minimum width sheet having a minimum width to fix the developer by the fixing unit.

According to this configuration, the fan is controlled based on the temperature at the position at which the minimum width sheet does not pass. Therefore, it is possible to appropriately control the driving of the fan depending on the sheet size.

Further, in a case of performing continuous printing on a predetermined number or more of sheets, the controller may be configured to stop the fan irrelevant to the heating unit temperature during a period ranging from start of the fixing to completion of the fixing for a predetermined number of sheets.

An overshoot, in which the temperature of the heating unit greatly exceeds the fixing temperature, is caused, and the minute particles tend to be generated during the period ranging from the start of the fixing to the completion of the fixing for the predetermined number of sheets. According to this configuration, the fan is stopped during this period, and hence it is possible to suppress the discharge of the minute particles to the outside of the main body casing.

Further, during the fixing, in a case of determining that the heating unit temperature is not less than the threshold value and that the developer on the sheet passes through a predetermined range in a widthwise direction of the sheet base on printing data, the controller may be configured to stop the fan, the predetermined range including a position which corresponds to a peak of a temperature distribution of the heating unit. During the fixing, in a case of determining that the heating unit temperature is not less than the threshold value and that the developer on the sheet does not pass through the predetermined range based on the printing data, the controller may be configured to drive the fan.

When the developer is heated in the predetermined range including the position corresponding to the peak of the heating unit, the minute particles are easily generated from the developer. According to this configuration, in this case, the fan is stopped, and hence it is possible to suppress the discharge of the minute particles to the outside of the main body casing. Further, when the developer is not heated in the predetermined range of the heating unit, the minute particles are hardly generated from the developer. According to this configuration, in this case, the fan is driven, and hence it is possible to cool the fixing unit, while suppressing the discharge of the minute particles to the outside of the main body casing.

Further, in a case that the controller stops the fan during the fixing, the controller may be configured to drive the fan after termination or after interruption of printing.

According to this configuration, even when the temperature of the fixing unit is raised by stopping the fan during the fixing, then the fan is driven after the termination or after the interruption of the printing, and hence it is possible to appropriately cool the fixing unit.

Further, the image forming apparatus may further include a photoreceptor; a first cleaner configured to recover the developer on the photoreceptor; a belt configured to make contact with the photoreceptor; and a second cleaner configured to recover the developer on the belt; wherein the controller may be configured to execute a cleaning process for recovering the developer on the first cleaner by the second cleaner via the photoreceptor and the belt; and the controller may be configured to drive the fan during the cleaning process.

According to this configuration, it is possible to cool the fixing unit during the cleaning process.

Further, the controller may be configured to execute an expanding process for expanding received printing data to a raster image; and a waiting process for stopping supply of a predetermined sheet until completion of the expanding process for the predetermined sheet; and the controller may be configured to drive the fan during the waiting process.

According to this configuration, it is possible to cool the fixing unit during the waiting process.

Further, the heating unit may be a heating roller which is heated by a heater.

According to another aspect of the present disclosure, there is provided an image forming apparatus including: a main body casing; a fixing unit configured to fix a developer to a sheet by heating and pressurization; a fan configured to discharge air inside the main body casing to outside of the main body casing; and a controller. In a case of performing continuous printing on more than a predetermined number of sheets, the controller may be configured to: stop the fan during a period ranging from start of fixing to completion of the fixing for the predetermined number of sheets; and drive the fan after completion of the fixing for the predetermined number of sheets.

According to this configuration, the minute particles, which are generated in the high temperature state of the fixing unit, can be suppressed from being discharged to the outside of the main body casing.

According to still another aspect of the present disclosure, there is provided an image forming apparatus including: a main body casing; a fixing unit configured to fix a developer to a sheet by heating and pressurization; a fan configured to discharge air inside the main body casing to outside of the main body casing; and a controller. The controller may be configured to: stop the fan during fixing the developer on the sheet by the fixing unit; and drive the fan after termination or after interruption of fixing the developer on the sheet by the fixing unit.

According to this configuration, the fan is stopped during the fixing. Therefore, the minute particles, which are generated in the high temperature state of the fixing unit, can be suppressed from being discharged to the outside of the main body casing.

FIGS. 12A and 12B are drawings illustrative of a fixing unit according to a seventh embodiment, wherein FIG. 12A is a drawing illustrative of configuration around a heating roller of the fixing unit, and FIG. 12B is a graph illustrative of a temperature distribution of the heating roller when the electric power is applied to respective heaters.

Figure 1:
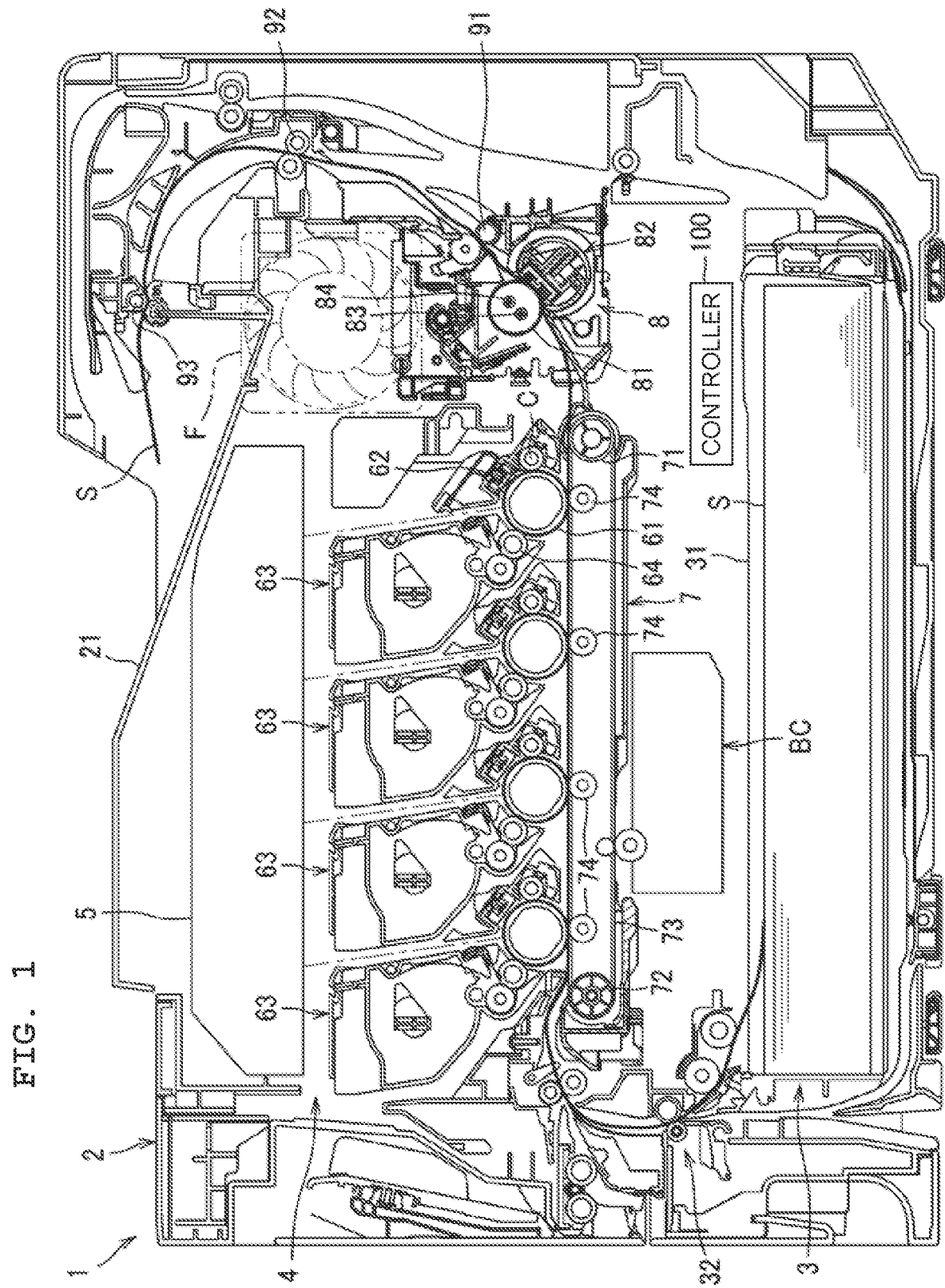
FIG. 1 is a drawing illustrative of configuration of a color printer according to a first embodiment.

Next, a first embodiment will be explained in detail appropriately with reference to the drawings. As depicted in FIG. 1, a color printer 1 as an example of the image forming apparatus is provided with a main body casing 2, a sheet supply unit 3, an image forming unit 4, a fan F, and a controller 100. The main body casing 2 has a discharge tray 21 disposed on an upper surface.

The sheet supply unit 3 is provided with a supply tray 31 which is capable of accommodating a plurality of sheets S, and a sheet supply mechanism 32 which supplies the sheet S to the image forming unit 4.

The image forming unit 4 has the function to form an image on the sheet S. The image forming unit 4 has an exposure unit 5, photosensitive drums 61 each of which is an example of the photoreceptor, electrifiers (chargers) 62, cleaning rollers C each of which is an example of the first cleaner, developing cartridges 63, a transfer unit 7, a belt cleaner BC which is an example of the second cleaner, and a fixing unit 8. The image forming unit 4 is provided with the four photosensitive drums 61, the four electrifiers 62, and the four developing cartridges 63.

The exposure unit 5 is provided with, for example, a plurality of unillustrated light sources, polygon mirrors, lenses, and reflecting mirrors. The exposure unit 5 allows a light beam to outgo so that the surface of the photosensitive drum 61 is exposed therewith. Accordingly, an electrostatic latent image is formed on the surface of the photosensitive drum 61.

The photosensitive drum 61 is a member having a photosensitive layer formed on the outer circumference of a cylindrical main drum body having the conductivity. The four photosensitive drums 61 are arranged while being aligned in the conveying direction of the sheet S. The electrifier 62 has the function to electrify the surface of the photosensitive drum 61. The electrifier 62 has, for example, an electrifying wire and a grid electrode. The cleaning roller C is a roller which is capable of recovering the toner as an example of the developer existing on the photosensitive drum 61. Each of the developing cartridges 63 has a developing roller 64 which is capable of carrying the toner. The toner of yellow, magenta, cyan, or black is accommodated in the developing cartridge 63.

The transfer unit 7 is provided with a driving roller 71, a driven roller 72, a belt 73, and four transfer rollers 74. The belt 73 is an endless belt which is provided to stretch between the driving roller 71 and the driven roller 72. The outer circumferential surface of the belt 73 makes contact with the four photosensitive drums 61. The transfer roller 74 is arranged at the inside of the belt 73 so that the belt 73 is interposed between the transfer roller 74 and the corresponding photosensitive drum 61.

The belt cleaner BC has the function to recover the toner on the belt 73. The belt cleaner BC is provided with a roller which recovers the toner on the belt 73, and a box which accommodates the toner.

The fixing unit 8 has the function to fix the toner to the sheet S by means of the heating and the pressurization. The fixing unit 8 is provided with a heating roller 81 which is an example of the heating unit, a pressurizing unit 82, a first heater 83, and a second heater 84. The heating roller 81 is a roller which heats the sheet S. The pressurizing unit 82 is arranged to interpose the sheet S between the pressurizing unit 82 and the heating roller 81. The pressurizing unit 82 has the function to apply the pressure to the sheet S between the pressurizing unit 82 and the heating roller 81. The heaters 83, 84 are arranged at the inside of the heating roller 81. The heaters 83, 84 are, for example, halogen heaters, and the heaters 83, 84 generate the heat when the electric power is applied so that the heating roller 81 is heated.

The fan F has the function to discharge the heat of the fixing unit 8 to the outside of the main body casing 2. The fan F is positioned over or above the fixing unit 8.

The image forming unit 4 electrifies the surface of the photosensitive drum 61 by means of the electrifier 62, and then the surface of the photosensitive drum 61 is exposed by the exposure unit 5. Accordingly, the electrostatic latent image is formed on the surface of the photosensitive drum 61. Subsequently, the image forming unit 4 supplies the toner from the developing roller 64 to the electrostatic latent image on the photosensitive drum 61. Accordingly, the toner image is formed on the photosensitive drum 61.

Subsequently, the sheet S, which is supplied from the sheet supply unit 3, is conveyed by the belt 73, while the image forming unit 4 allows the sheet S to pass between the photosensitive drum 61 and the transfer roller 74. Thus, the toner image on the photosensitive drum 61 is transferred to the sheet S. Accordingly, the toner image is formed on the sheet S.

After that, the sheet S, on which the toner image has been formed, is conveyed to the space between the heating roller 81 and the pressurizing unit 82, and thus the image forming unit 4 fixes the toner image to the sheet S. Accordingly, the image is formed on the sheet S. The sheet S, on which the image has been formed, is conveyed by conveying rollers 91, 92, and the sheet S is discharged to the discharge tray 21 by a discharge roller 93.

Figure 2A:
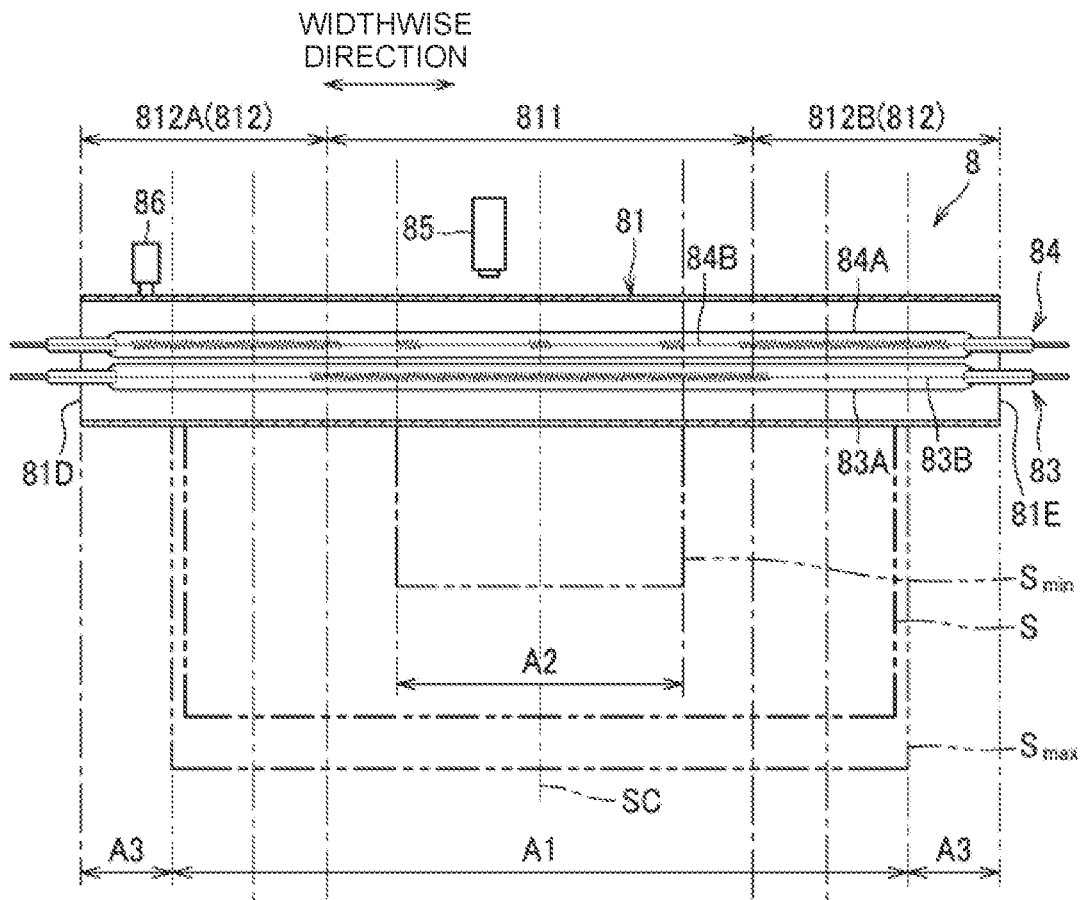
FIG. 2A is a drawing illustrative of configuration around a heating roller of a fixing unit.

As depicted in FIG. 2A, the fixing unit 8 further comprises a first temperature sensor 85 and a second temperature sensor 86 as an example of the temperature sensor, in addition to the heating roller 81, the first heater 83, and the second heater 84.

The first heater 83 is a halogen heater which has a glass tube 83A and a filament 83B provided at the inside of the glass tube 83A. In the case of the filament 83B, the heat generating portions are concentrated at the central portion in the widthwise direction of the sheet S as compared with the respective end portions in the widthwise direction of the sheet S. Accordingly, the first heater 83 strongly heats the central area 811 of the heating roller 81 as compared with the end portion areas 812.

In this case, the widthwise direction of the sheet S is the direction which is orthogonal to the conveying direction of the sheet S. The widthwise direction of the sheet S is the direction which is parallel to the longitudinal direction of the heating roller 81. In the following description, the widthwise direction of the sheet S is simply referred to as "widthwise direction" as well. Further, the central area 811 of the heating roller 81 is the area which includes the central portion of the heating roller 81 in the widthwise direction. Further, the end portion area 812 of the heating roller 81 is the area of the heating roller 81 which is positioned on the outer side in the widthwise direction as compared with the central area 811. The heating roller 81 has, as the end portion areas 812, a first end portion area 812A which is the area disposed between the central area 811 and one end edge 81D of the heating roller 81, and a second end portion area 812B which is the area disposed between the central area 811 and the other end edge 81E of the heating roller 81.

The second heater 84 is a halogen heater which has a glass tube 84A and a filament 84B provided at the inside of the glass tube 84A. In the case of the filament 84B, the heat generating portions are concentrated at the respective end portions in the widthwise direction as compared with the central portion in the widthwise direction. Accordingly, the second heater 84 strongly heats the end portion areas 812 of the heating roller 81 as compared with the central area 811.

Figure 2B:
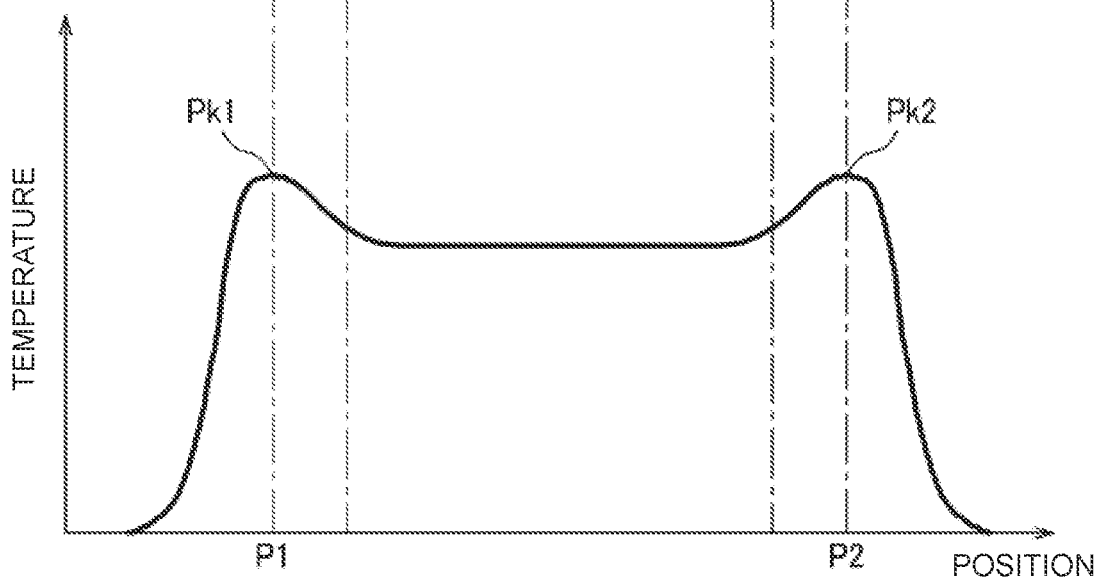
FIG. 2B is a graph illustrative of a temperature distribution of the heating roller when the electric power is applied to respective heaters.

FIG. 2B is a graph illustrative of the temperature distribution in the widthwise direction of the heating roller 81 when the electric power is applied to both of the first heater 83 and the second heater 84. In particular, the temperature distribution is a temperature distribution provided, for example, if the respective heaters 83, 84 are turned ON in accordance with the reception of the printing instruction when no influence is exerted, for example, by the sheet S passing through the fixing unit 8. The temperature distribution has peaks Pk1, Pk2 at positions corresponding to the respective end portion areas 812 of the heating roller 81. In the following explanation, the positions in the widthwise direction, which correspond to the peaks Pk1, Pk2 of the temperature distribution of the heating roller 81, are referred to as "peak positions P1, P2" as well.

The heating roller 81 has a maximum contact area A1, a minimum contact area A2, and non-contact areas A3. The maximum contact area A1 is an area which makes contact with the sheet Smax when the sheet Smax, which has the maximum width capable of being subjected to the fixing in the fixing unit 8, is conveyed. The maximum contact area A1 includes the central area 811 and the portions of the end portion areas 812 from which the outer end portions in the widthwise direction are excluded.

Further, the minimum contact area A2 is an area which makes contact with the sheet Smin when the sheet Smin, which has the minimum width capable of being fixed in the fixing unit 8, is conveyed. The minimum contact area A2 includes the central portion of the central area 811 in the widthwise direction. Further, the non-contact area A3 is an area which makes no contact with the sheet Smax when the sheet Smax is conveyed. The non-contact area A3 is the outer end portion in the widthwise direction of the end portion area 812.

The peak positions P1, P2 are positioned on the outer side in the widthwise direction as compared with the minimum contact area A2. Further, the peak positions P1, P2 are positioned on the inner side in the widthwise direction as compared with the non-contact areas A3. That is, the peak positions P1, P2 are positioned between the minimum contact area A2 and the non-contact areas A3 in the widthwise direction.

The first temperature sensor 85 is a sensor which is provided to detect the temperature of the central area 811. In particular, the first temperature sensor 85 detects the temperature of the minimum contact area A2 of the central area 811. The first detected temperature TD1, which is detected by the first temperature sensor 85, is outputted to the controller 100. The controller 100 controls the first heater 83 and the second heater 84 so that the first detected temperature TD1 becomes a target value for the fixing during the printing.

The first temperature sensor 85 is arranged at the central portion in the widthwise direction of the heating roller 81. In particular, the first temperature sensor 85 is positioned within the range of the minimum contact area A2.

The first temperature sensor 85 is arranged at the position which is deviated toward the first end portion area 812A with respect to the center (conveyance center SC) in the widthwise direction of the heating roller 81. The first temperature sensor 85 detects the first detected temperature TD1 in a state in which the first temperature sensor 85 is not brought in contact with the heating roller 81. In particular, the first temperature sensor 85 is arranged while providing a space from the outer circumferential surface of the heating roller 81. For example, a non-contact type thermistor can be used as the first temperature sensor 85. Note that in this embodiment, when the sheet S is conveyed in the fixing unit 8 of the color printer 1, the sheet S is conveyed while using the center of the heating roller 81 in the widthwise direction as the conveyance center SC.

The second temperature sensor 86 is a sensor which is provided to detect the temperature of the non-contact area A3 of the first end portion area 812A. The second detected temperature TD2, which is detected by the second temperature sensor 86, is outputted to the controller 100.

The second temperature sensor 86 is arranged at the position different from the peak positions P1, P2 in the widthwise direction. Specifically, the second temperature sensor 86 is arranged at the position at which the sheet Smin having the minimum width does not pass. More specifically, the second temperature sensor 86 is arranged within the range of the non-contact area A3 as the end portion in the widthwise direction of the heating roller 81. The second temperature sensor 86 detects the second detected temperature TD2 in a state in which the second temperature sensor 86 is brought in contact with the heating roller 81. For example, a contact type thermistor can be used as the second temperature sensor 86.

The controller 100 has, for example, CPU, RAM, ROM, and an input/output circuit. The controller 100 executes the control by performing various calculating processes based on the programs and the data stored, for example, in ROM. The controller 100 has the function to calculate the heating unit temperature TP based on the second detected temperature TD2 detected by the second temperature sensor 86 during the fixing. In this case, the term "during the fixing" refers to the period which is included in the period ranging from the start of the fixing for the initial sheet S concerning the printing command until the termination of the fixing for the last sheet S and which includes at least the period in which the sheet S is actually fixed. In this embodiment, the period during the fixing is designated as the period ranging from the start of the fixing for the initial sheet S concerning the printing command to the termination of the fixing for the last sheet S, i.e., the continuous period including the period in which the sheet S does not pass through the fixing unit 8 as well. Note that when a plurality of sheets are subjected to the printing, the period during the fixing may be an intermittent period including only the periods in each of which the sheet S is actually fixed and not including the periods in each of which the sheet S does not pass through the fixing unit 8.

Further, in this embodiment, the controller 100 calculates the peak temperature corresponding to the temperature at the peak position P1 based on the second detected temperature TD2 during the fixing, and the calculated peak temperature is designated as the heating unit temperature TP. Specifically, in order to correct the second detected temperature TD2 to be the peak temperature which is higher than the second detected temperature TD2, the controller 100 calculates the heating unit temperature TP by multiplying the second detected temperature TD2 by a correction coefficient which is larger than 1 or adding a correction value having a positive value. Note that the correction coefficient and the correction value may be appropriately set by means of an experiment or the like. Further, the correction coefficient and the correction value may be set to be different values depending on the condition of, for example, the passage of the sheet S while considering the fluctuation of the peak position P1 on account of the influence of, for example, the sheet S passing through the fixing unit 8.

Figure 4:
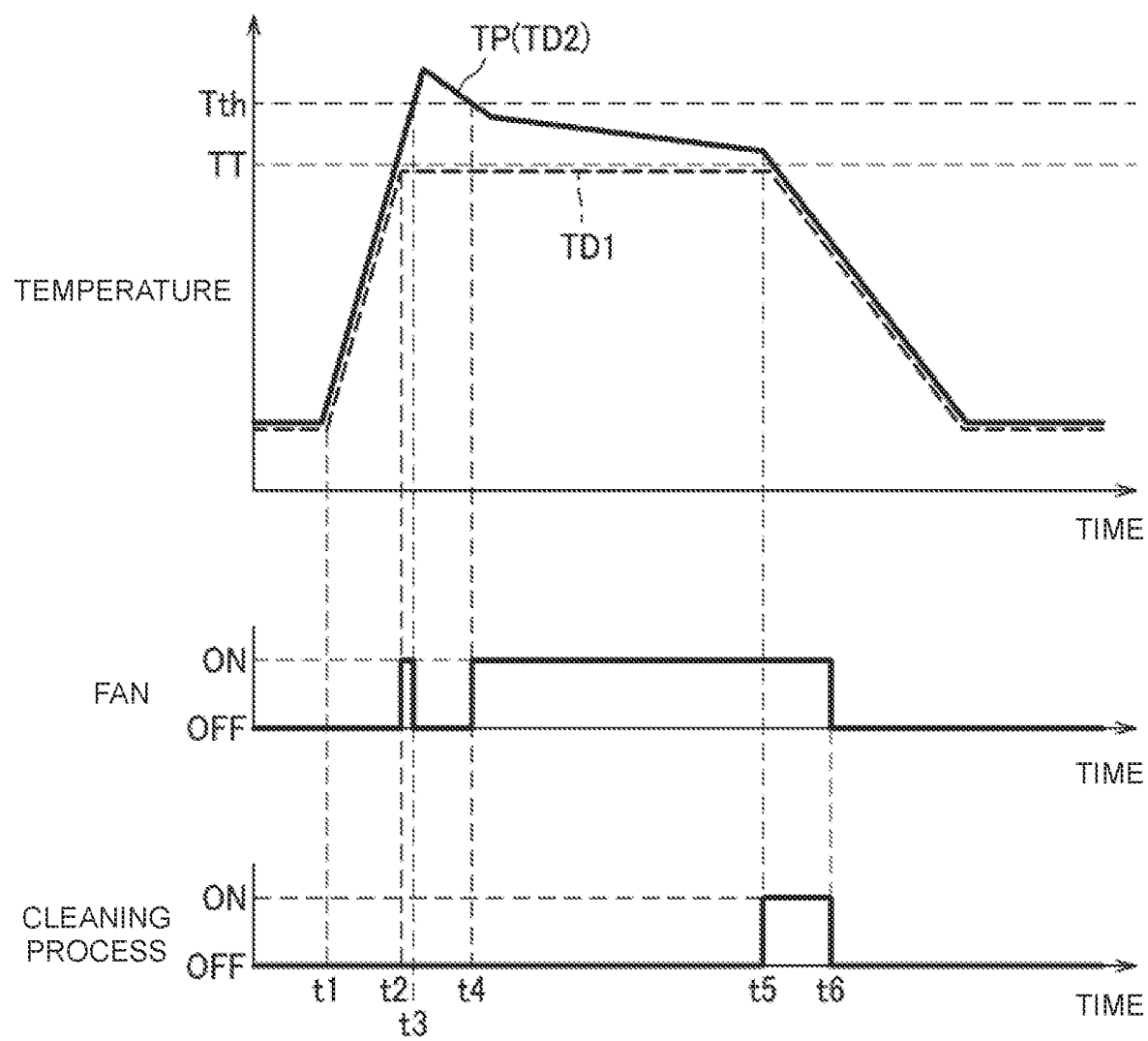
FIG. 4 is a time chart illustrative of an exemplary operation of a controller according to the first embodiment.

The controller 100 has the function to determine whether or not the heating unit temperature TP is not less than a threshold value Tth during the fixing so that the driving of the fan F is controlled based on the determination result. In this case, the threshold value Tth is the temperature at which the minute particles may be generated, for example, from the toner and the resin parts. For example, as depicted in FIG. 4, the threshold value Tth is set to a value which is higher than the fixing temperature TT as the target value of the fixing.

If it is determined during the fixing that the heating unit temperature TP is not less than the threshold value Tth, the controller 100 stops the fan F. If it is determined during the fixing that the heating unit temperature TP is less than the threshold value Tth, the controller 100 drives the fan F.

The controller 100 has the function to execute the cleaning process after the termination of the printing. The cleaning process is a process in which the toner on the cleaning roller C is recovered by the belt cleaner BC via the photosensitive drum 61 and the belt 73.

The controller 100 has the function to drive the fan F after the termination of the printing. In particular, the controller 100 drives the fan F during the cleaning process after the termination of the printing.

Next, an explanation will be made in detail about a fan driving process in order to control the driving of the fan F. If the printing command is received, the controller 100 executes the fan driving process depicted in FIG. 3.

In the fan driving process, the controller 100 firstly determines whether or not the fixing is started for the first sheet S (S1). In this case, the method for determining whether or not the fixing is started is exemplified, for example, by a method for determining whether or not the first detected temperature TD1 is not less than the fixing temperature TT.

If it is determined in Step S1 that the fixing is started (Yes), the controller 100 detects the second detected temperature TD2 by means of the second temperature sensor 86 (S2). After Step S2, the controller 100 estimates the temperature of the peak position P1 by calculating the heating unit temperature TP based on the second detected temperature TD2 (S3).

After Step S3, the controller 100 determines whether or not the possibility to generate the minute particles is high by determining whether or not the heating unit temperature TP is not less than the threshold value Tth (S4). If it is determined in Step S4 that TP≥Tth is given (Yes), the possibility to generate the minute particles is high. Therefore, the controller 100 stops the fan F (S5). If it is determined in Step S4 that TP<Tth is given (No), the possibility to generate the minute particles is low. Therefore, the controller 100 drives the fan F (S6) in order to suppress any excessive increase in the temperature of the fixing unit 8.

After Step S5 or Step S6, the controller 100 determines whether or not the printing is terminated (S7). In this case, the method for determining whether or not the printing is terminated is exemplified, for example, by a method in which it is determined that the printing is terminated when the fixing is terminated for the last sheet S, and a method in which it is determined that the printing is terminated when the last sheet S is discharged to the discharge tray 21. Note that the termination of the fixing or the completion of the discharge may be determined, for example, based on the elapsed time after the detection of the sheet with a sheet sensor arranged on the upstream side from the fixing unit 8 in the conveying direction of the sheet S.

If it is determined in Step S7 that the printing is not terminated (No), the controller 100 returns to the process of Step S2. If it is determined in Step S7 that the printing is terminated (Yes), then the controller 100 starts the cleaning process (S8), and the controller 100 drives the fan F (S9).

In particular, if such a state is given that the fan F is stopped upon the termination of the printing, the controller 100 drives the fan F in Step S9. Further, if such a state is given that the fan F is driven upon the termination of the printing, the controller 100 maintains the state in which the fan F is driven in Step S9.

After Step S9, the controller 100 determines whether or not the cleaning process is terminated (S10). If it is determined in Step S10 that the cleaning process is terminated (Yes), then the controller 100 stops the fan F (S11), and the controller 100 terminates this process.

Next, an explanation will be made about an exemplary operation of the controller 100. In this case, it is assumed that the fan F is in the stopped state in the waiting mode and the sleep mode in which no printing command is received.

As depicted in FIG. 4, for example, if the printing command is received to perform the printing on the sheet Smax having the maximum width (time t1), the controller 100 turns ON the first heater 83 and the second heater 84. Accordingly, the first detected temperature TD1 and the second detected temperature TD2 are progressively raised.

If the first detected temperature TD1 is not less than the fixing temperature TT (time t2), the controller 100 determines that the fixing is started (S1: Yes). After that, the controller 100 calculates the heating unit temperature TP based on the second detected temperature TD2, and the controller 100 determines whether or not the heating unit temperature TP is not less than the threshold value Tth (S2 to S4). The heating unit temperature TP is less than the threshold value Tth immediately after the start of the fixing (time t2). Therefore, the controller 100 drives the fan F (S6).

After that, if the heating unit temperature TP is not less than the threshold value Tth (time t3), the controller 100 stops the fan F (S5). Accordingly, even when the minute particles are generated, for example, from the toner disposed in the vicinity of the peak positions P1, P2 on account of the high temperature of the heating unit temperature TP corresponding to the peak temperature, the minute particles are suppressed from being discharged to the outside of the main body casing 2. In particular, if the first heater 83 and the second heater 84 are turned ON by receiving the printing command, the overshoot, in which the heating unit temperature TP greatly exceeds the fixing temperature TT, easily takes place. Therefore, the minute particles can be suppressed from being discharged to the outside of the main body casing 2 by stopping the fan F.

If the overshoot takes place (if TP≥Tth is given), then the controller 100 lowers the electric power application amount for the second heater 84, and thus the heating unit temperature TP is lowered. After that, if the heating unit temperature TP is less than the threshold value Tth (time t4), the controller 100 drives the fan F (S6). The fan F is driven when the heating unit temperature TP is lowered to the temperature at which the minute particles are hardly generated. Therefore, it is possible to cool the fixing unit 8, while suppressing the minute particles from being discharged to the outside of the main body casing 2. Note that the minute particles, which are generated on account of TP≥Tth, are adsorbed, for example, by the frame of the fixing unit 8 by stopping the fan F. Therefore, even when the fan F is driven if TP<Tth is given, the minute particles are hardly discharged to the outside of the main body casing 2.

Note that the exemplary case depicted in FIG. 4 is illustrative of such an example that the number of times of the provision of TP≥Tth during the fixing is one. However, if the number of times of the provision of TP≥Tth during the fixing is any plural, the controller 100 stops the fan F every time when TP≥Tth is given.

If the printing is terminated (time t5), then the controller 100 starts the cleaning process (S8), and the controller 100 drives the fan F (S9). If the cleaning process is terminated (time t6), the controller 100 stops the fan F (S11).

According to the above, it is possible to obtain the following effect in this embodiment. The fan F is stopped if the heating unit temperature TP is not less than the threshold value Tth during the fixing. Therefore, the minute particles, which are generated in the state of the high temperature of the fixing unit 8, can be suppressed from being discharged to the outside of the main body casing 2.

The driving of the fan F is controlled based on the heating unit temperature TP as the temperature at the peak position P1. Therefore, it is possible to appropriately determine whether or not the minute particles are generated, for example, as compared with a case in which the driving of the fan F is controlled based on the temperature at any position different from the peak positions P1, P2. Further, the heating unit temperature TP, which is the temperature at the peak position P1, is calculated based on the second detected temperature TD2 of the second temperature sensor 86 which detects the temperature at the position different from the peak positions P1, P2. Therefore, even when the second temperature sensor 86 is arranged at any position at which it is impossible to detect the temperature at the peak positions P1, P2, then it is possible to appropriately control the driving of the fan F.

The temperature at the end portion of the heating roller 81 can be detected by the second temperature sensor 86. Therefore, for example, it is possible to suppress the temperature at the end portion of the heating roller 81 from being excessively raised, based on the detection result of the second temperature sensor 86.

The second temperature sensor 86 is arranged at the position at which the sheet Smin having the minimum width does not pass. Therefore, the fan F can be controlled based on the temperature at the position at which the sheet Smin having the minimum width does not pass. As a result, it is possible to appropriately control the driving of the fan F in accordance with the sheet size.

Even if the temperature of the fixing unit 8 is raised by stopping the fan F during the fixing, the fan F is driven during the cleaning process after the termination of the printing. Thus, it is possible to cool the fixing unit 8 during the cleaning process.

Note that the present disclosure can be utilized in various forms as exemplified below, without being limited to the embodiment described above. In the following explanation, the members and the processes, which are approximately the same as or equivalent to those of the embodiment described above, are designated by the same reference numerals, any explanation of which will be omitted.

Figure 5:
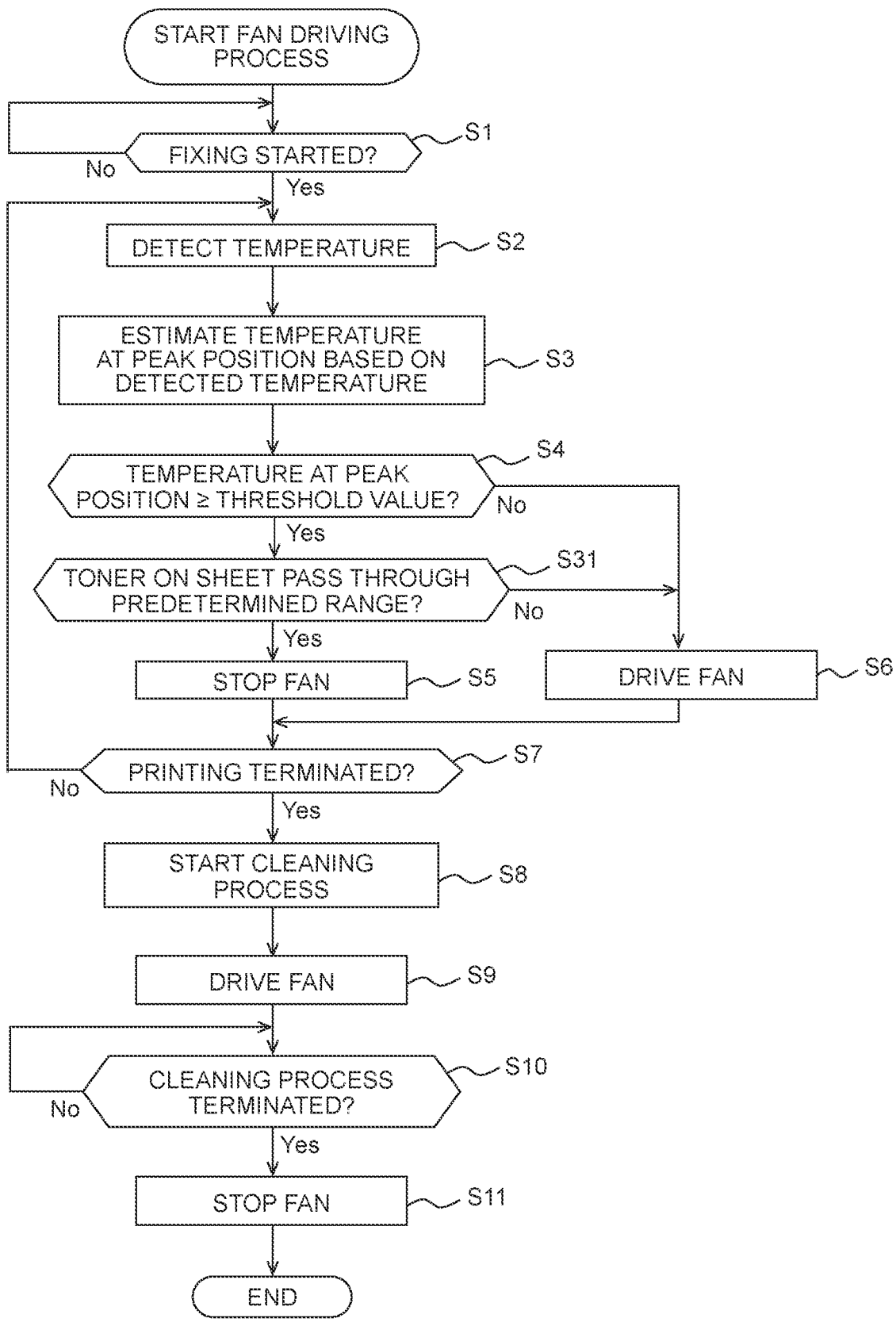
FIG. 5 is a flow chart illustrative of a fan driving process according to a second embodiment.

As depicted in FIG. 5, in a fan driving process according to a second embodiment, another condition (S31) is added as the condition to drive/stop the fan F during the fixing, in addition to the condition of the heating unit temperature TP as referred to in the embodiment described above. In this case, in FIG. 5, Step S31 is newly added to the flow chart depicted in FIG. 3.

In the fan driving process depicted in FIG. 5, if the controller 100 makes determination of "Yes" in Step S4, the controller 100 executes the process of Step S31. In Step S31, the controller 100 determines whether or not the toner on the sheet S passes through a predetermined range including the peak positions P1, P2, based on the printing data. In this embodiment, the predetermined range resides in a portion of the end portion area 812 depicted in FIG. 2 other than the non-contact area A3. If the image data of the printing data is within the predetermined range, the controller 100 determines that the toner on the sheet S passes through the predetermined range. If the image data is not within the predetermined range, the controller 100 determines that the toner on the sheet S does not pass through the predetermined range.

If it is determined in Step S31 that the toner on the sheet S passes through the predetermined range (Yes), the controller 100 stops the fan F (S5). If it is determined in Step S31 that the toner on the sheet S does not pass through the predetermined range (No), the controller 100 drives the fan F (S6).

In other words, if it is determined during the fixing that the heating unit temperature TP is not less than the threshold value Tth (S4: Yes), and it is determined that the toner on the sheet S passes through the predetermined range based on the printing data (S31: Yes), then the controller 100 stops the fan F (S5). If it is determined during the fixing that the heating unit temperature TP is not less than the threshold value Tth (S4: Yes), and it is determined that the toner on the sheet S does not pass through the predetermined range based on the printing data (S31: No), then the controller 100 drives the fan F (S6).

According to the second embodiment, it is possible to obtain the following effect. When the toner is heated in the predetermined range including the peak positions P1, P2 of the heating roller 81, the minute particles are easily generated from the toner. In this case, the fan F is stopped, and thus it is possible to suppress the minute particles from being discharged to the outside of the main body casing 2. On the other hand, when the toner is not heated in the predetermined range of the heating roller 81, the minute particles are hardly generated from the toner. In this case, the fan F is driven, and thus it is possible to suppress any excessive increase in the temperature of the fixing unit 8.

Figure 6:
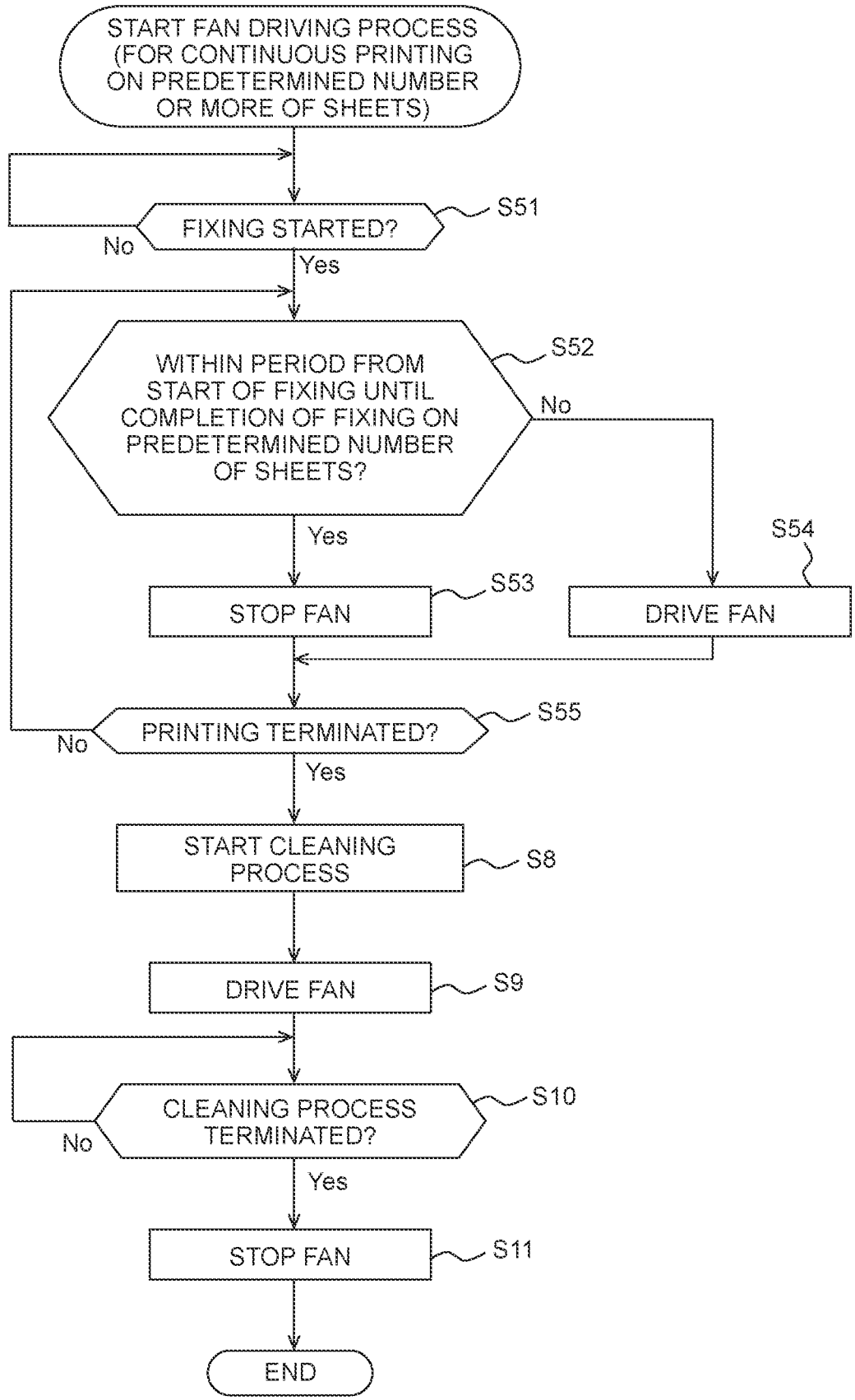
FIG. 6 is a flow chart illustrative of a fan driving process according to a third embodiment.

As depicted in FIG. 6, a fan driving process according to a third embodiment is a process to control the driving of the fan F when the continuous printing is executed on the sheets S of not less than a predetermined number. Note that if the printing is performed on the sheets S of less than the predetermined number, for example, the fan driving process according to the first embodiment or the second embodiment may be executed. In this case, the predetermined number is a plural, which is set, for example, to five, ten, or fifteen.

If the printing command is received to execute the continuous printing on the sheets S of not less than the predetermined number, the controller 100 executes the fan driving process depicted in FIG. 6. In the fan driving process depicted in FIG. 6, the controller 100 firstly determines whether or not the fixing is started for the first sheet S (S51). Note that the determination to determine the start of the fixing may be performed in accordance with a method which is the same as or equivalent to that of Step S1 described above.

If it is determined in Step S51 that the fixing is started (Yes), the controller 100 determines whether or not the process is within a period PD ranging from the start of the fixing until the completion of the fixing for the sheets of the predetermined number (S52). In this case, the period PD may be appropriately set beforehand by means of an experiment or the like.

If it is determined in Step S52 that the process is within the period PD (Yes), the controller 100 stops the fan F (S53). In other words, if the continuous printing is performed on the sheets S of not less than the predetermined number, the controller 100 stops the fan F irrelevant to the heating unit temperature TP during the period ranging from the start of the fixing to the completion of the fixing for the predetermined number of sheets.

If it is determined in Step S52 that the process is not within the period PD (No), the controller 100 drives the fan F (S54). After Step S53 or Step S54, the controller 100 determines whether or not the printing is terminated (S55). Note that the determination to determine the termination of the fixing may be performed in accordance with a method which is the same as or equivalent to that of Step S7 described above.

If it is determined in Step S55 that the printing is not terminated (No), the controller 100 returns to the process of Step S52. If it is determined in Step S55 that the printing is terminated (Yes), then the controller 100 executes the processes of Steps S8 to S11 described above, and this process is terminated.

Figure 7:
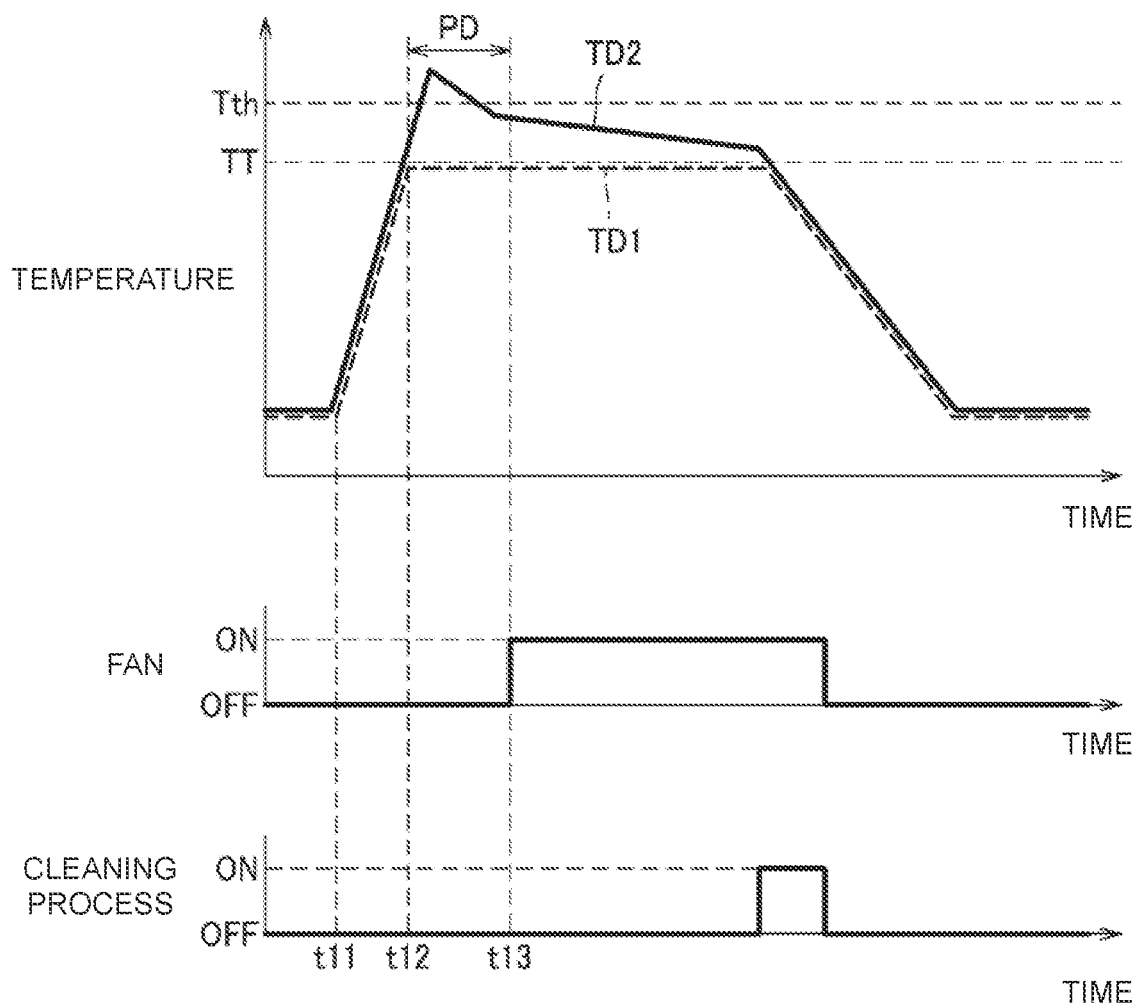
FIG. 7 is a time chart illustrative of an exemplary operation of a controller according to the third embodiment.

Next, an explanation will be made about an exemplary operation of the controller 100 according to a third embodiment. As depicted in FIG. 7, if the controller 100 receives the printing command to perform the continuous printing on the sheets S of not less than a predetermined number (time t11), then the controller 100 turns ON the respective heaters 83, 84, and the controller 100 determines whether or not the fixing is started. If it is determined that the fixing is started (time t12), the controller 100 stops the fan F during a period PD from the start of the fixing (S52: Yes→S53).

If the period PD elapses from the start of the fixing (time t13), the controller 100 drives the fan F (S52: No→S54). The operation of the controller 100 after the termination of the printing is the same as or equivalent to that of the first embodiment, any explanation of which will be omitted.

According to the third embodiment, it is possible to obtain the following effect. In the period PD ranging from the start of the fixing to the completion of the fixing for the predetermined number of the sheets, the overshoot, in which the temperature at the peak position P1, P2 of the heating roller 81 greatly exceeds the fixing temperature TT, arises, and the minute particles are easily generated. Therefore, the fan F is stopped during this period PD, and thus it is possible to suppress the minute particles from being discharged to the outside of the main body casing 2.

Figure 8:
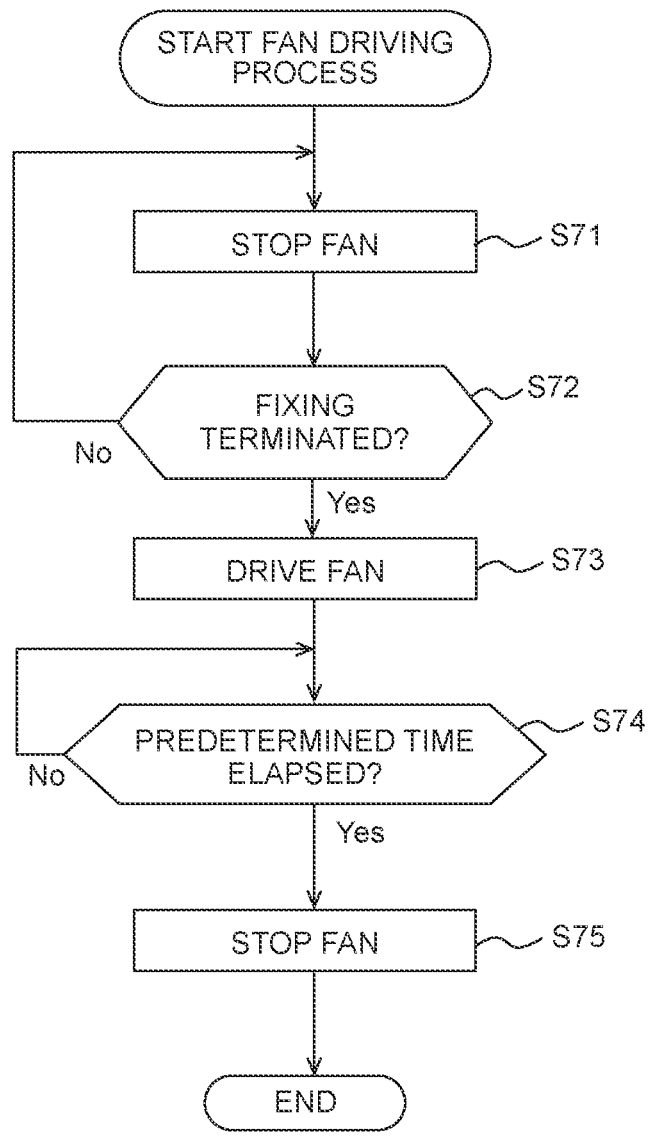
FIG. 8 is a flow chart illustrative of a fan driving process according to a fourth embodiment.

As depicted in FIG. 8, a fan driving process according to a fourth embodiment is a process in which the fan F is stopped during the fixing, and the fan F is driven after the termination of the printing. In particular, in the fan driving process according to the fourth embodiment, the fan F is stopped during the period ranging from the reception of the printing command to the termination of the fixing. In other words, the fan F is stopped during the fixing. Then, the fan F is driven for a predetermined time after the termination of the fixing. In other words, the fan F is driven even after the termination of the printing (for example, after the sheet S is discharged to the discharge tray 21).

In the fan driving process depicted in FIG. 8, if the controller 100 receives the printing command (START), the controller 100 firstly stops the fan F (S71). After Step S71, the controller 100 determines whether or not the fixing is terminated (S72). Note that the determination for the termination of the fixing may be performed in accordance with the method explained in the first embodiment.

If it is determined in Step S72 that the fixing is not terminated (No), the controller 100 returns to the process of Step S71. If it is determined in Step S72 that the fixing is terminated (Yes), the controller 100 drives the fan F (S73).

After Step S73, the controller 100 determines whether or not a predetermined time elapses after the termination of the fixing (S74). If it is determined in Step S74 that the predetermined time elapses (Yes), then the controller 100 stops the fan F (S75), and this process is terminated.

Figure 9:
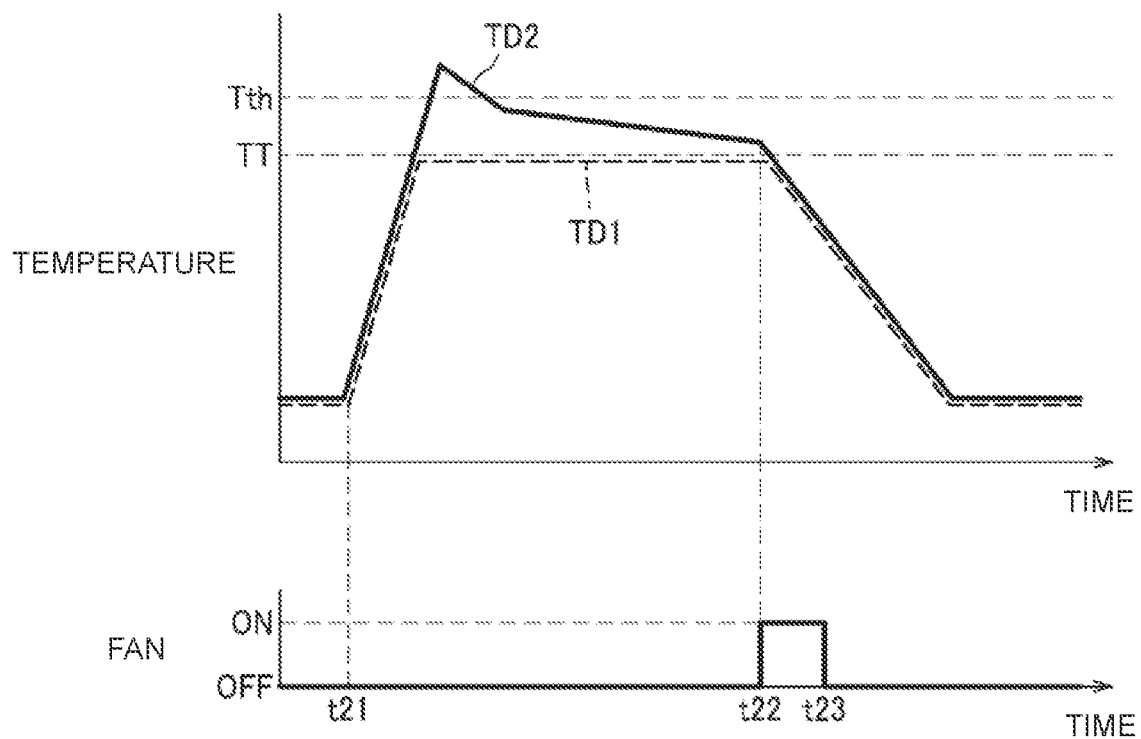
FIG. 9 is a time chart illustrative of an exemplary operation of a controller according to the fourth embodiment.

Next, an explanation will be made about an exemplary operation of the controller 100 according to the fourth embodiment. As depicted in FIG. 9, if the controller 100 receives the printing command (time t21), the controller 100 stops the fan F (S71). If the fixing is terminated (time t22), the controller 100 drives the fan F (S72: Yes S73).

If a predetermined time elapses after the termination of the fixing (time t23), then the controller 100 stops the fan F (S75), and this process is terminated. As described above, according to the fourth embodiment, the fan F is stopped during the fixing in which the fixing unit 8 has the high temperature. Therefore, it is possible to more reliably suppress the minute particles from being discharged to the outside of the main body casing 2.

Note that in the fourth embodiment, the fan F is stopped during the period ranging from the reception of the printing command to the termination of the fixing. However, for example, the fan F may be stopped during the period ranging from the start of the fixing to the termination of the printing. The timing, at which the stop of the fan F is started, is the timing at which the fixing is started. Thus, for example, it is possible to make combination with any other process for driving the fan F during the period ranging from the reception of the printing command to the start of the fixing (for example, the process for driving the fan F during the waiting process as described later on).

Figure 10:
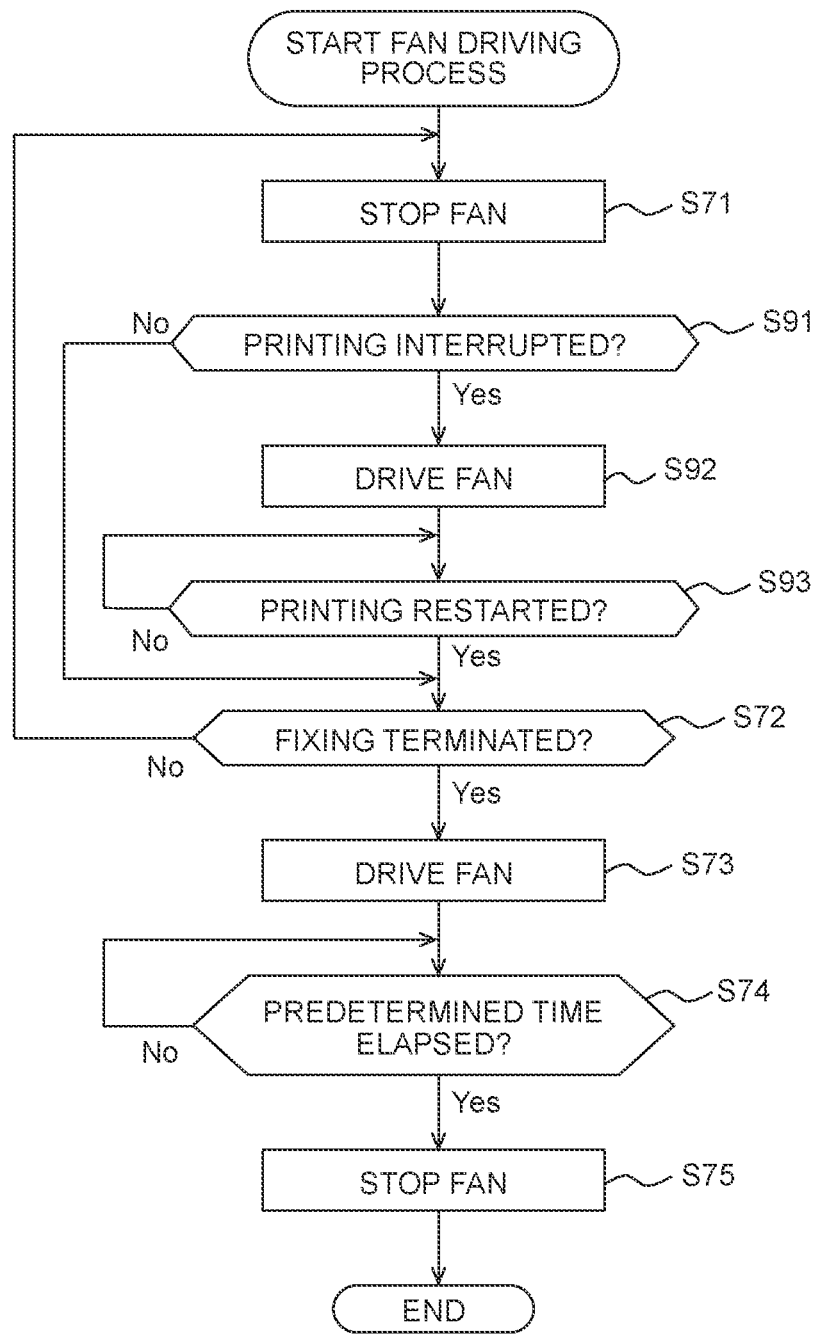
FIG. 10 is a flow chart illustrative of a fan driving process according to a fifth embodiment.

As depicted in FIG. 10, in a fan driving process according to a fifth embodiment, processes (S91 to S93) for driving the fan F after the interruption of the printing are added to the fan driving process according to the fourth embodiment. In the fan driving process depicted in FIG. 10, the controller 100 stops the fan F in Step S71, and then the controller 100 determines whether or not the printing is interrupted (S91). In this case, the determination of the interruption of the printing may be performed, for example, by determining whether or not the sheet S jams in the main body casing 2 based on a signal supplied from the sheet sensor.

If it is determined in Step S91 that the printing is interrupted (Yes), the controller 100 drives the fan F (S92). Note that if the cover of the main body casing 2 is opened during the driving of the fan F in Step S92, then the controller 100 may stop the fan F, and the controller 100 may restart the driving of the fan F after the cover is closed.

After Step S92, the controller 100 determines whether or not the printing is restarted (S93). Note that the determination to restart the printing may be performed, for example, by determining whether or not the jamming of the sheet S disappears based on a signal supplied from the sheet sensor. If the determination of "Yes" is made in Step S93, or if the determination of "No" is made in Step S91, then the controller 100 appropriately executes the processes of Steps S72 to S75 described above.

According to the fifth embodiment, it is possible to obtain the following effect. When the printing is interrupted, then the respective heaters 83, 84 are turned OFF, and hence the minute particles are hardly generated. Therefore, the minute particles can be suppressed from being discharged to the outside of the main body casing 2 by driving the fan F during the interruption of the printing.

Note that the processes (S91 to S93) for driving the fan F after the interruption of the printing may be combined with any form other than the fourth embodiment, for example, the first embodiment. In this case, for example, the processes of Steps S91 to S93 may be added before Step S7 after Step S5 and Step S6 depicted in FIG. 3.

The controller 100 may be capable of executing an expanding process in which the received printing data is expanded to a raster image, and a waiting process in which the supply of a predetermined sheet S is allowed to wait until the completion of the expanding process for the predetermined sheet S. In this case, the controller 100 may drive the fan F during the waiting process. Specifically, the controller 100 may execute a fan driving process according to a sixth embodiment depicted in FIG. 11. In this case, FIG. 11 is obtained by newly adding Steps S101 to S103 to the flow chart depicted in FIG. 10 and newly adding Step S104 in place of Step S74.

Figure 11:
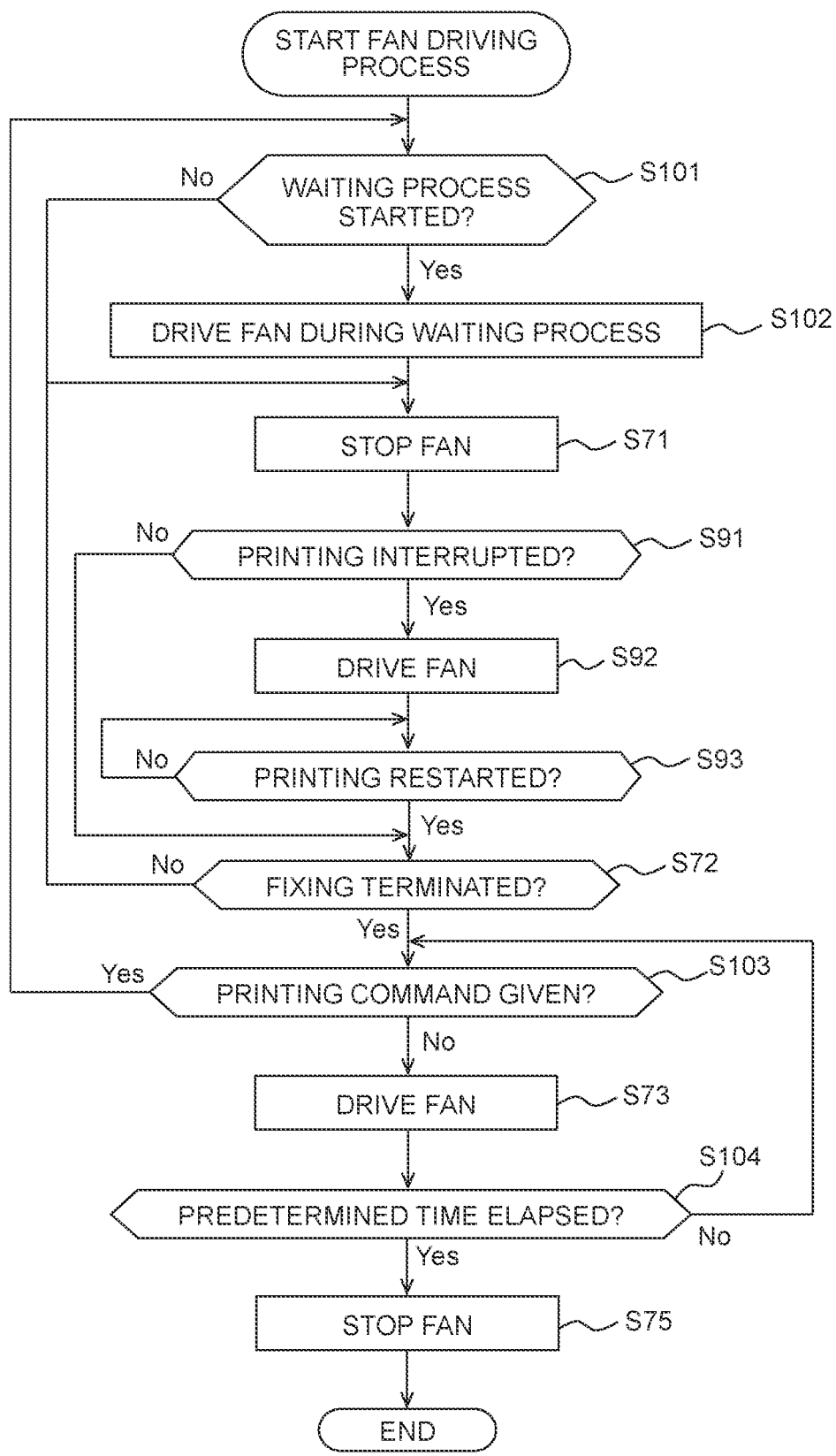
FIG. 11 is a flow chart illustrative of a fan driving process according to a sixth embodiment.

In the fan driving process depicted in FIG. 11, the controller 100 firstly determines whether or not the waiting process is started (S101). If it is determined in Step S101 that the waiting process is started (Yes), the controller 100 drives the fan F (S102) during the waiting process.

If it is determined that the determination of "No" is made after Step S102 or in Step S101, the controller 100 proceeds to the process of Step S71. If it is determined in Step S72 that the fixing is terminated (Yes), the controller 100 determines whether or not the printing command is given (S103).

If it is determined in Step S103 that the printing command is given (Yes), the controller 100 returns to the process of Step S101. If is determined in Step S103 that the printing command is not given (No), the controller 100 drives the fan F (S73).

After Step S73, the controller 100 determines whether or not a predetermined time elapses after the termination of the fixing (S104). If it is determined in Step S104 that the predetermined time does not elapse (No), the controller 100 returns to the process of Step S103. If it is determined in Step S104 that the predetermined time elapses (Yes), then the controller 100 stops the fan F (S75), and this process is terminated.

According to the sixth embodiment, it is possible to obtain the following effect. When the printing command is received during the printing or immediately after the termination of the printing, the next printing is consequently performed before driving the fan F for a predetermined time. Therefore, it is feared that the temperature of the fixing unit 8 may be excessively raised. However, when the printing command is received during the printing or immediately after the termination of the printing, if the waiting process is started (S101: Yes), then the fan F is driven (S102). Therefore, it is possible to suppress the excessive increase in the temperature of the fixing unit 8 during the waiting process.

Note that the processes (S101 to S104) for driving the fan F during the waiting process may be combined with any form other than the fifth embodiment depicted in FIG. 10, for example, the first embodiment. In this case, for example, the processes of Steps S101 and S102 may be added before Step S1 depicted in FIG. 3, and the processes of Steps S103 and S104 may be added between Step S7 and Step S8.

Figure 12A:
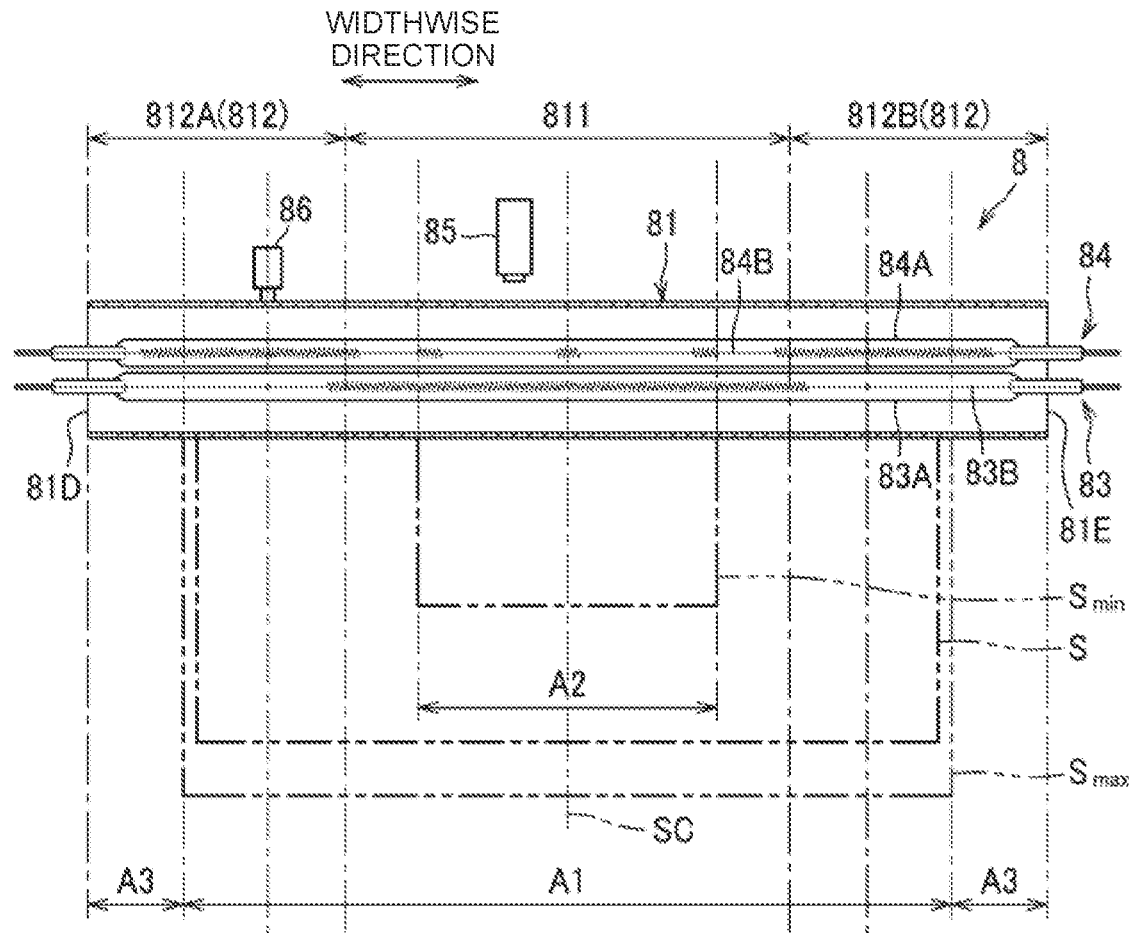
Figure 12B:
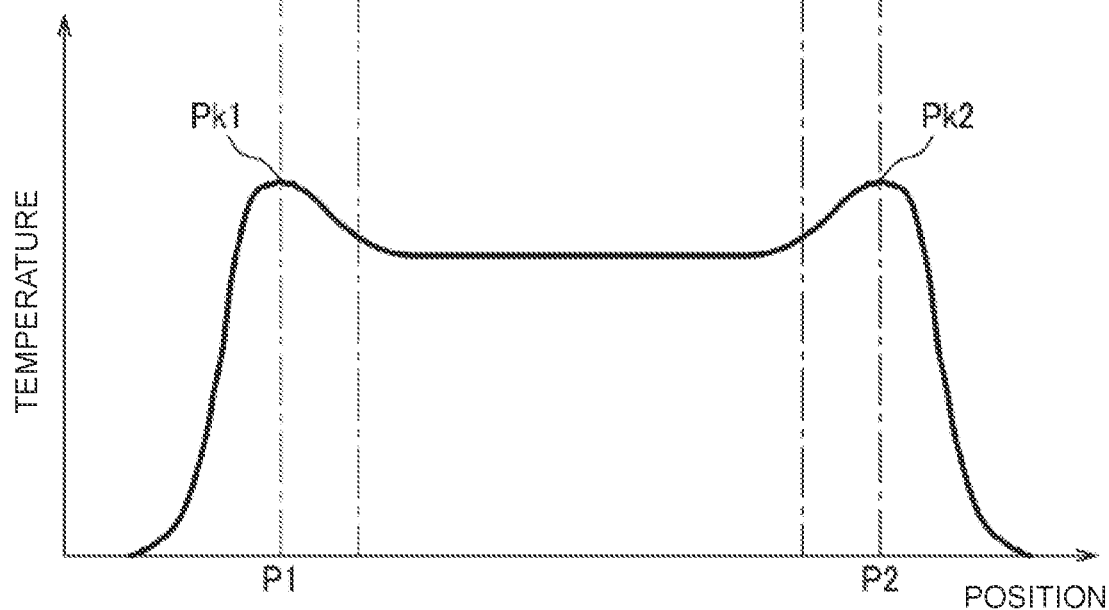

As depicted in FIG. 12, in a fixing unit 8 according to a seventh embodiment, the second temperature sensor 86 is arranged at the peak position P1. In this embodiment, the controller 100 designates the second detected temperature TD2 detected by the second temperature sensor 86 as the heating unit temperature TP. According to this embodiment, it is unnecessary to correct the second detected temperature TD2. Therefore, it is possible to reduce the load exerted on the controller 100.

The first embodiment exemplifies the second temperature sensor 86 as the temperature sensor by way of example. However, the present disclosure is not limited thereto. The temperature sensor may be the first temperature sensor 85. Even in this case, the first detected temperature TD1 detected by the first temperature sensor 85 is corrected by the controller 100 to the temperature at the peak position P1, P2, and thus it is possible to obtain the effect which is the same as or equivalent to that of the first embodiment.

Figure 3:
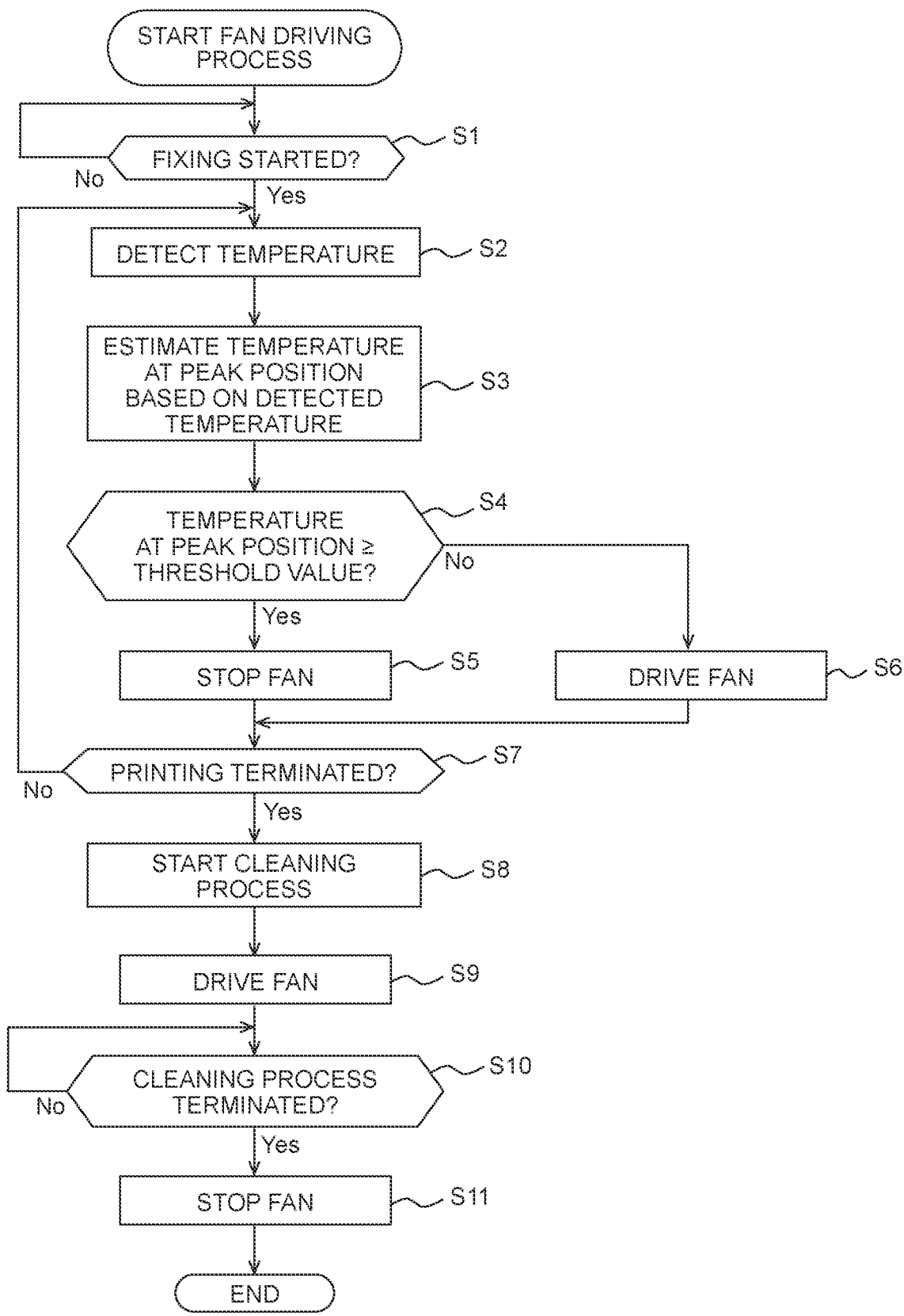
FIG. 3 is a flow chart illustrative of a fan driving process according to the first embodiment.

Step S54 in the fan driving process according to the third embodiment depicted in FIG. 6 may be replaced with the process for controlling the fan F based on the heating unit temperature TP during the fixing (Steps S2 to S6 depicted in FIG. 3). In other words, the fan is stopped from the start of the fixing until the completion of the fixing for a predetermined number of sheets. After the completion of the fixing for the predetermined number of sheets, the driving of the fan may be controlled based on the heating unit temperature.

While the teaching has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the teaching, and not limiting the teaching. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described teaching are provided below:

In the embodiments described above, the present disclosure is applied to the color printer 1. However, the present disclosure is not limited thereto. The present disclosure may be applied to other image forming apparatuses, for example, a monochrome or black-and-white printer, a copying machine, and a multifunction machine.

The heating unit is not limited to the heating roller 81. The heating unit may be provided with, for example, a nip plate which is heated by a heater, and a belt which is interposed between the nip plate and a pressurizing unit. Further, the photoreceptor may be a belt-shaped photoreceptor.

The first cleaner may be a plate-shaped blade which makes contact with the photosensitive drum. The second cleaner may have a plate-shaped blade which makes contact with the belt.

The present disclosure may be carried out while arbitrarily combining the respective elements explained in the embodiments and the modified embodiments described above.

What is claimed is:

1. An image forming apparatus comprising:
   a main body casing;
   a fixing unit configured to fix developer to a sheet by heating and pressurization, the fixing unit including: a heating unit configured to heat the sheet; and an end portion temperature sensor configured to detect a temperature of the heating unit;
   a fan configured to discharge air inside the main body casing to outside of the main body casing; and
   a controller,
   wherein when the fixing unit is fixing the developer to the sheet, the controller is configured to:
      determine a heating unit temperature based on the temperature detected by the end portion temperature sensor;
      stop the fan in a case of determining that the heating unit temperature is not less than a threshold value; and
      drive the fan in a case of determining that the heating unit temperature is less than the threshold value,
   wherein the heating unit is elongated in a longitudinal direction, the heating unit has a minimum-width-sheet passing area through which a minimum-width-sheet passes, the minimum-width-sheet having a minimum width to fix the developer by the fixing unit, and in the longitudinal direction of the heating unit, the end portion temperature sensor is arranged outside of the minimum-width-sheet passing area.

2. The image forming apparatus according to claim 1, wherein:

the end portion temperature sensor is arranged at a position corresponding to a peak of a temperature distribution of the heating unit; and the controller is configured to determine the temperature of the heating unit detected by the end portion temperature sensor as the heating unit temperature.

3. The image forming apparatus according to claim 1, wherein:

the end portion temperature sensor is arranged at a position different from a position corresponding to a peak of a temperature distribution of the heating unit; and the controller is configured to:
calculate a temperature which corresponds to a temperature at the position corresponding to the peak based on the detected temperature; and
determine the calculated temperature as the heating unit temperature.

4. The image forming apparatus according to claim 1, wherein in a case of performing continuous printing on a predetermined number or more of sheets, the controller is configured to stop the fan irrelevant to the heating unit temperature during a period ranging from start of the fixing to completion of the fixing for the predetermined number of sheets.

5. The image forming apparatus according to claim 1, wherein in a case that the controller stops the fan during the fixing, the controller is configured to drive the fan after termination or after interruption of printing.

6. The image forming apparatus according to claim 5, further comprising:

a photoreceptor;
a first cleaner configured to recover the developer on the photoreceptor;
a belt configured to make contact with the photoreceptor; and
a second cleaner configured to recover the developer on the belt, wherein:
the controller is configured to execute a cleaning process for recovering the developer on the first cleaner by the second cleaner via the photoreceptor and the belt; and
the controller is configured to drive the fan during the cleaning process.

7. The image forming apparatus according to claim 1, wherein the heating unit has a maximum-width-sheet passing area through which a maximum-width-sheet passes, the maximum-width-sheet having a maximum width to fix the developer by the fixing unit, and in the longitudinal direction of the heating unit, the end portion temperature sensor is arranged outside of the maximum-width-sheet passing area.

8. The image forming apparatus according to claim 1, wherein the fixing unit includes: a heater configured to heat the heating unit; and a central portion temperature sensor configured to detect the temperature of the heating unit, in the longitudinal direction of the heating unit, the central portion temperature sensor is arranged within the minimum-width-sheet passing area, and the controller is configured to control the heater such that the temperature detected by the central portion temperature sensor becomes a target value for fixing the developer to the sheet.

9. The image forming apparatus according to claim 8, wherein the heating unit is a heating roller, the central portion temperature sensor is configured to detect the temperature of the heating unit without contacting the heating roller, and the end portion temperature sensor is configured to detect the temperature of the heating unit in a state that the end portion temperature sensor contacts the heating roller.

10. The image forming apparatus according to claim 1, wherein the threshold value is higher than a target value for fixing the developer to the sheet, and the threshold value is a temperature at which an overshoot is caused.

11. An image forming apparatus comprising:

a main body casing;
a fixing unit configured to fix developer to a sheet by heating and pressurization, the fixing unit including: a heating unit configured to heat the sheet and a temperature sensor configured to detect a temperature of the heating unit;
a fan configured to discharge air inside the main body casing to outside of the main body casing; and
a controller, wherein when the fixing unit is fixing the developer to the sheet, the controller is configured to:
determine a heating unit temperature based on the temperature detected by the temperature sensor;
stop the fan in a case of determining that the heating unit temperature is not less than a threshold value; and
drive the fan in a case of determining that the heating unit temperature is less than the threshold value, wherein during the fixing, in a case of determining that the heating unit temperature is not less than the threshold value and that the developer on the sheet passes through a predetermined range in a widthwise direction of the sheet based on printing data, the controller is configured to stop the fan, the predetermined range including a position which corresponds to a peak of a temperature distribution of the heating unit; and during the fixing, in a case of determining that the heating unit temperature is not less than the threshold value and that the developer on the sheet does not pass through the predetermined range based on the printing data, the controller is configured to drive the fan.

12. An image forming apparatus comprising:

a main body casing;
a fixing unit configured to fix developer to a sheet by heating and pressurization, the fixing unit including: a heating unit configured to heat the sheet and a temperature sensor configured to detect a temperature of the heating unit;
a fan configured to discharge air inside the main body casing to outside of the main body casing; and
a controller, wherein when the fixing unit is fixing the developer to the sheet, the controller is configured to:
  determine a heating unit temperature based on the temperature detected by the temperature sensor;
  stop the fan in a case of determining that the heating unit temperature is not less than a threshold value; and
  drive the fan in a case of determining that the heating unit temperature is less than the threshold value,
wherein in a case that the controller stops the fan during the fixing, the controller is configured to drive the fan after termination or after interruption of printing,
wherein the controller is configured to execute:
  an expanding process for expanding received printing data to a raster image; and
  a waiting process for stopping supply of a predetermined sheet until completion of the expanding process for the predetermined sheet; and
the controller is configured to drive the fan during the waiting process.

* * * * *